(12) United States Patent
Kuniyasu et al.

(10) Patent No.: US 10,845,541 B2
(45) Date of Patent: Nov. 24, 2020

(54) CLADDING MODE LIGHT REMOVAL STRUCTURE AND LASER APPARATUS

(71) Applicant: FUJIKURA LTD., Tokyo (JP)

(72) Inventors: Kenji Kuniyasu, Chiba (JP); Ryokichi Matsumoto, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 16/495,166

(22) PCT Filed: Mar. 26, 2018

(86) PCT No.: PCT/JP2018/012044
§ 371 (c)(1),
(2) Date: Sep. 18, 2019

(87) PCT Pub. No.: WO2018/181133
PCT Pub. Date: Oct. 4, 2018

(65) Prior Publication Data
US 2020/0103593 A1  Apr. 2, 2020

(30) Foreign Application Priority Data

Mar. 28, 2017  (JP) ................................ 2017-064022

(51) Int. Cl.
*G02B 6/25* (2006.01)
*G02B 6/255* (2006.01)
(Continued)

(52) U.S. Cl.
CPC .............. *G02B 6/255* (2013.01); *H01S 3/067* (2013.01); *H01S 3/094007* (2013.01)

(58) Field of Classification Search
CPC .... G02B 6/255; H01S 3/067; H01S 3/094007
(Continued)

(56) References Cited

U.S. PATENT DOCUMENTS

2003/0231845 A1  12/2003  Patlakh et al.
2011/0317967 A1  12/2011  Kumkar et al.
(Continued)

FOREIGN PATENT DOCUMENTS

JP  2007-271786 A  10/2007
JP  2012-513612 A  6/2012
(Continued)

*Primary Examiner* — Jerry M Blevins
(74) *Attorney, Agent, or Firm* — Osha Bergman Watanabe & Burton LLP (57) ABSTRACT

A cladding mode light removal structure includes: an input-side exposure portion where a covering is removed from an end of an input-side optical fiber to expose a cladding of the input-side optical fiber; an output-side exposure portion where a covering is removed from an end of an output-side optical fiber to expose an output-side cladding of the output-side optical fiber; a fusion splice portion at which the input-side exposure portion and the output-side exposure portion are connected by fusion splice; a fiber housing portion having an accommodation space that receives the input-side exposure portion, the output-side exposure portion, and the fusion splice portion; a high refractive index resin having a refractive index equal to or higher than that of the cladding exposed at the input-side exposure portion; and a low refractive index portion of a medium.

8 Claims, 4 Drawing Sheets

(51) Int. Cl.
  *H01S 3/067*   (2006.01)
  *H01S 3/094*   (2006.01)
(58) Field of Classification Search
  USPC .......................................................... 385/125
  See application file for complete search history.

(56) References Cited

U.S. PATENT DOCUMENTS

2015/0029580 A1* 1/2015 Taya .................. G02B 6/03638
                                                359/341.1
2019/0237929 A1* 8/2019 Matsumoto ......... H01S 3/06733

FOREIGN PATENT DOCUMENTS

| JP | 4954737 B2   | 6/2012 |
| JP | 2015-014800 A | 1/2015 |
| JP | 2016-027662 A | 2/2016 |

* cited by examiner

CLADDING MODE LIGHT REMOVAL STRUCTURE AND LASER APPARATUS

TECHNICAL FIELD

The present invention relates to a cladding mode light removal structure, and more particularly to a structure for removing cladding mode light that propagates through a cladding of an optical fiber in a laser apparatus such as a fiber laser.

BACKGROUND

In a laser apparatus such as a fiber laser, a portion of light propagating through a core of an optical fiber may leak into a cladding due to misalignment of optical axes at a fusion splice portion of optical fibers or microbend of an optical fiber and thus propagate as cladding mode light through the cladding. Such cladding mode light causes deterioration of the quality of a laser beam outputted from a laser apparatus. Therefore, it is desirable to remove cladding mode light before a laser beam is outputted from the laser apparatus. Increase of an output of a laser apparatus such as a fiber laser enhances the power of such cladding mode light. Accordingly, demand for removing cladding mode light has risen even more.

Figure 1:
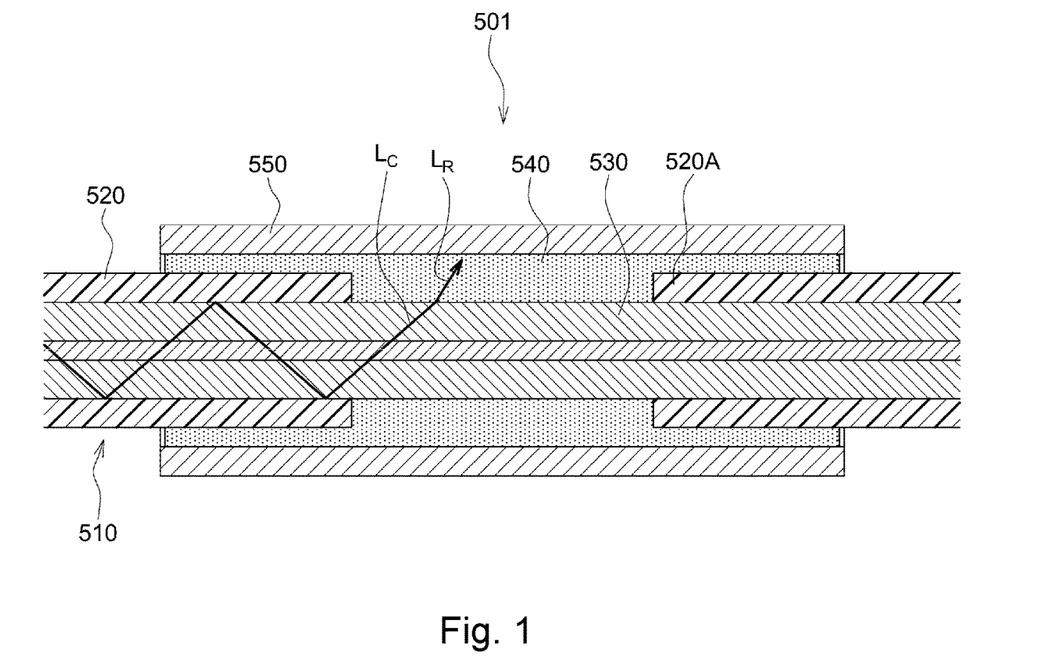
FIG. 1 is a cross-sectional view schematically showing a conventional cladding mode light removal structure.

In order to remove such cladding mode light, there has been proposed a method of removing a portion of a covering of an optical fiber so as to expose a cladding and then covering the exposed cladding with a resin having a refractive index higher than that of the cladding (see, e.g., Patent Literature 1). FIG. 1 is a cross-sectional view schematically showing such a conventional cladding mode light removal structure. As shown in FIG. 1, in this cladding mode light removal structure 501, a portion of a covering 520 of an optical fiber 510 is removed so as to expose a cladding 530. The exposed portion of the cladding 530 is covered with a resin 540 having a refractive index higher than that of the cladding 530.

With such a structure, as the refractive index of the resin 540, which surrounds the cladding 530, is higher than the refractive index of the cladding 530, cladding mode light $L_C$ propagating through the cladding 530 leaks into the resin 540. A portion of the cladding mode light $L_C$ is absorbed into the resin 540 and thus converted into heat. The generated heat is dissipated from a housing 550 into an outside of the housing 550 through a heat sink (not shown) connected to the housing 550. In this manner, unnecessary cladding mode light $L_C$ can be removed by conversion of the cladding mode light $L_C$ into heat, which is in turn dissipated into an outside of the housing 550.

The cladding mode light $L_R$, which has leaked into the resin 540, propagates through the resin 540 while a portion of the cladding mode light $L_R$ is converted into heat. In the structure illustrated in FIG. 1, a portion of the resin 540 that surrounds the cladding 530 is held in contact with a covering 520A located on a downstream side of the structure. Therefore, a portion of the cladding mode light $L_R$, which has leaked into the resin 540, may impinge the downstream covering 520A. In such a case, the cladding mode light $L_R$ is absorbed into the covering 520A, which generates heat and rises its temperature. Furthermore, even if the cladding mode light $L_R$ does not directly impinge the covering 520A, the heat generated in the resin 540 that has absorbed the cladding mode light $L_R$ may be transmitted through the resin 540 to the covering 520A, so that the temperature of the covering 520A increases. Such increased temperature of the covering 520A may cause firing of the covering 520A or deterioration of the optical characteristics of the optical fiber 510.

PATENT LITERATURE

Patent Literature 1: JP 4954737 B

One or more embodiments of the present invention provide a cladding mode light removal structure that can suppress heat generation at a covering of an optical fiber and effectively remove cladding mode light and a laser apparatus including such a cladding mode light removal structure.

SUMMARY

According to a first aspect of the present invention, there is provided a cladding mode light removal structure that can suppress heat generation at a covering of an optical fiber and effectively remove cladding mode light. This cladding mode light removal structure is used for removing cladding mode light that propagates through a cladding of an optical fiber. The cladding mode light removal structure includes an input-side cladding exposure portion where a covering is removed at an end of an input-side optical fiber so that an input-side cladding of the input-side optical fiber is exposed, an output-side cladding exposure portion where a covering is removed at an end of an output-side optical fiber so that an output-side cladding of the output-side optical fiber is exposed, a fusion splice portion at which the input-side cladding exposure portion and the output-side cladding exposure portion are connected to each other by fusion splice, and a fiber housing portion in which an accommodation space is formed to receive the input-side cladding exposure portion, the output-side cladding exposure portion, and the fusion splice portion. The cladding mode light removal structure further includes a high refractive index resin having a refractive index that is equal to or higher than a refractive index of the input-side cladding exposed at the input-side cladding exposure portion. The high refractive index resin is provided within the accommodation space of the fiber housing portion so as to surround a downstream end of the covering of the input-side optical fiber, an entire portion of the input-side cladding that is exposed at the input-side cladding exposure portion, the fusion splice portion, and a portion of the output-side cladding exposed at the output-side cladding exposure portion. The cladding mode light removal structure further includes a low refractive index portion of a medium having a refractive index lower than a refractive index of the output-side cladding of the output-side cladding exposure portion. The low refractive index portion is located around the output-side cladding exposure portion between the high refractive index resin and the covering of the output-side optical fiber along an axial direction of the output-side optical fiber.

The term "cladding" used in connection with one or more embodiments of the present invention refers to the outermost cladding layer if an optical fiber has a plurality of cladding layers. Specifically, the term "input-side cladding" refers to the outmost cladding layer of an input-side optical fiber if the input-side optical fiber has a plurality of cladding layers. The term "output-side cladding" refers to the outermost cladding layer of an output-side optical fiber if the output-side optical fiber has a plurality of cladding layers.

With this configuration, when cladding mode light that has propagated through the input-side cladding of the input-side optical fiber reaches the input-side cladding exposure portion, the cladding mode light leaks into the high refractive index resin because the entire input-side cladding is covered with the high refractive index resin. Thus, a portion of the cladding mode light is absorbed by the high refractive index resin and thus converted into heat. The generated heat can be dissipated into the outside of the cladding mode light removal structure through the fiber housing portion. Accordingly, the cladding mode light can effectively be removed. At that time, the low refractive index portion is interposed between the high refractive index resin and the covering of the output-side optical fiber along the axial direction of the output-side optical fiber. Therefore, the heat generated in the high refractive index resin is hindered from being transmitted directly to the covering of the output-side optical fiber.

Furthermore, even if the cladding mode light propagating through the cladding of the input-side optical fiber does not completely leak into the high refractive index resin and partially enters the cladding of the output-side optical fiber, such cladding mode light that has entered the cladding can be confined in the cladding of the output-side optical fiber because the low refractive index portion, which is a medium having a refractive index lower than the refractive index of the output-side cladding, is located around the output-side cladding exposure portion. Therefore, the cladding mode light is inhibited from leaking near the covering of the output-side optical fiber. Thus, absorption of the cladding mode light, which would be caused when leaked cladding mode light directly enters the covering, is inhibited.

The length x of the low refractive index portion along the axial direction of the output-side optical fiber may satisfy $$x > \frac{\frac{D_1 - D_2}{2}}{\tan\left(\sin^{-1}\left(\frac{n_H}{n_L} \times NA\right)\right)}$$

where $D_1$ is a diameter of the covering of the output-side optical fiber, $D_2$ is a diameter of the output-side cladding of the output-side optical fiber, $n_H$ is a refractive index of the high refractive index resin, $n_L$ is a refractive index of the medium of the low refractive index portion, and NA is a numerical aperture of cladding mode light in the high refractive index resin. When those conditions are met, cladding mode light that has entered the low refractive index portion from the high refractive index resin is prevented from directly impinging the covering of the output-side optical fiber. Therefore, heat generation at the covering of the output-side optical fiber can be inhibited more effectively.

Furthermore, the input-side cladding may have a diameter greater than a diameter of the output-side cladding. When the diameter of the input-side cladding is greater than the diameter of the output-side cladding, cladding mode light propagating through the cladding of the input-side optical fiber is likely to leak into the high refractive index resin at the fusion splice portion. Therefore, the cladding mode light can be removed more effectively. Furthermore, this configuration can lower the power density of the cladding mode light leaking out of the cladding as compared to the case where the cladding of the input-side optical fiber and the cladding of the output-side optical fiber have the same diameter. Accordingly, the temperature of the high refractive index resin is inhibited from locally increasing.

Furthermore, the medium of the low refractive index portion may comprise air. When the low refractive index portion is formed by air, cladding mode light that has not leaked into the high refractive index resin and entered the cladding of the output-side optical fiber can effectively be confined in the cladding of the output-side optical fiber. Therefore, cladding mode light is effectively inhibited from leaking near the covering of the output-side optical fiber.

According to a second aspect of the present invention, there is provided a laser apparatus that can suppress heat generation at a covering of an optical fiber and effectively remove cladding mode light. This laser apparatus includes an optical fiber amplifier including a pumping light source operable to output pumping light and an amplification optical fiber including a core into which a rare earth element to be excited by the pumping light from the pumping light source has been doped, and the aforementioned cladding mode light removal structure. In the cladding mode light removal structure, the input-side optical fiber corresponds to the amplification optical fiber of the optical fiber amplifier or an optical fiber located on a downstream side of the amplification optical fiber.

According to one or more embodiments of the present invention, when cladding mode light that has propagated through the input-side cladding of the input-side optical fiber reaches the input-side cladding exposure portion, the cladding mode light leaks into the high refractive index resin because the entire input-side cladding is covered with the high refractive index resin. Thus, a portion of the cladding mode light is absorbed by the high refractive index resin and thus converted into heat. The generated heat can be dissipated into the outside of the cladding mode light removal structure through the fiber housing portion. At that time, the low refractive index portion is interposed between the high refractive index resin and the covering of the output-side optical fiber along the axial direction of the output-side optical fiber. Therefore, the heat generated in the high refractive index resin is hindered from being transmitted directly to the covering of the output-side optical fiber.

Furthermore, even if the cladding mode light propagating through the cladding of the input-side optical fiber does not completely leak into the high refractive index resin and partially enters the cladding of the output-side optical fiber, such cladding mode light that has entered the cladding can be confined in the cladding of the output-side optical fiber because the low refractive index portion, which is a medium having a refractive index lower than the refractive index of the output-side cladding, is located around the output-side cladding exposure portion. Therefore, the cladding mode light is inhibited from leaking near the covering of the output-side optical fiber. Thus, absorption of the cladding mode light, which would be caused when leaked cladding mode light directly enters the covering, is inhibited.

DETAILED DESCRIPTION

Embodiments of a cladding mode light removal structure and a laser apparatus according to the present invention will be described in detail below with reference to FIGS. 2 to 7. In FIGS. 2 to 7, the same or corresponding components are denoted by the same or corresponding reference numerals and will not be described below repetitively. Furthermore, in FIGS. 2 to 7, the scales or dimensions of components may be exaggerated, or some components may be omitted.

Figure 2:
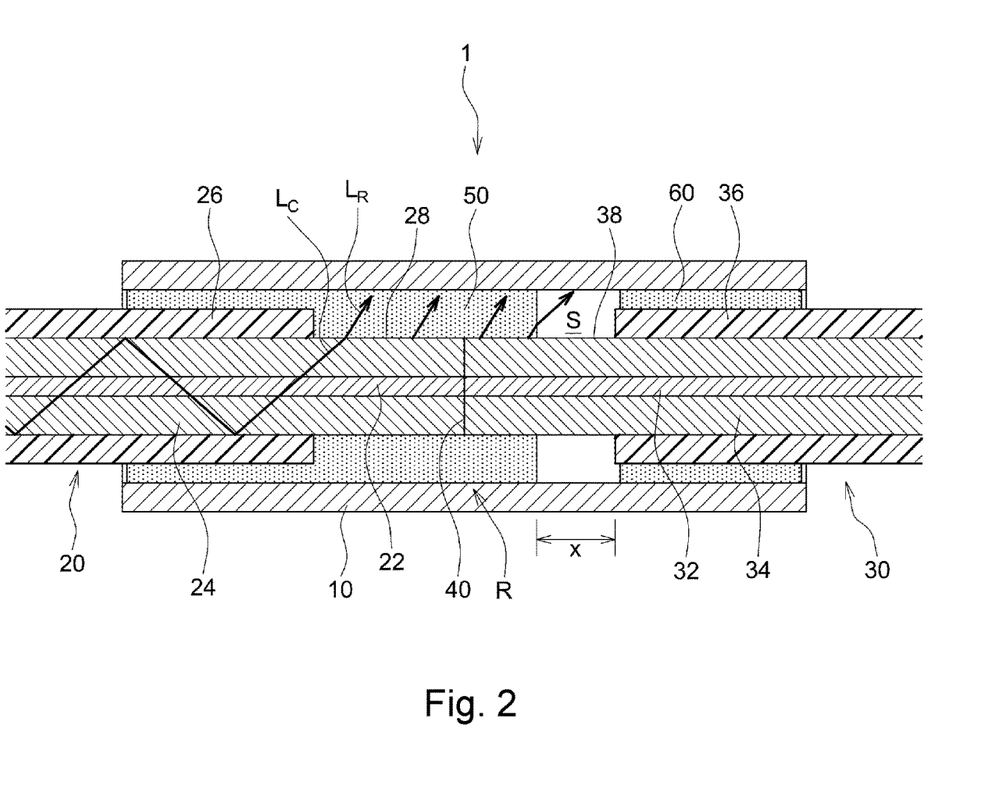
FIG. 2 is cross-sectional view schematically showing a cladding mode light removal structure according to one or more embodiments of the present invention.

FIG. 2 is a cross-sectional view schematically showing a cladding mode light removal structure 1 according to one or more embodiments of the present invention. As shown in FIG. 2, the cladding mode light removal structure 1 has a fiber housing portion 10 in the form of a generally rectangular parallelepiped. For example, the fiber housing portion 10 is formed of a material such as aluminum nitride, which has a high thermal conductivity. The fiber housing portion 10 is connected to a heat sink (not shown). A fusion splice portion 40 in which an input-side optical fiber 20 and an output-side optical fiber 30, which is located at a downstream side of the input-side optical fiber 20, are connected to each other by fusion splice is received within an accommodation space R formed inside of the fiber housing portion 10.

The input-side optical fiber 20 of one or more embodiments includes a core 22, a cladding 24 that surrounds the core 22, and a covering 26 that surrounds the cladding 24. The cladding 24 is formed of a material having a refractive index lower than the refractive index of the core 22 (e.g., $SiO_2$). The covering 26 is formed of a resin having a refractive index lower than the refractive index of the cladding 24 (e.g., low refractive index polymer). Similarly, the output-side optical fiber 30 includes a core 32, a cladding 34 that surround the core 32, and a covering 36 that surrounds the cladding 34. The cladding 34 is formed of a material having a refractive index lower than the refractive index of the core 32 (e.g., $SiO_2$). The covering 36 is formed of a resin having a refractive index lower than the refractive index of the cladding 34 (e.g., low refractive index polymer).

The whole circumference of the covering 26 of the input-side optical fiber 20 is removed from a downstream end of the input-side optical fiber 20 by a predetermined length, which forms an input-side cladding exposure portion 28 in which the cladding (input-side cladding) 24 of the input-side optical fiber 20 is exposed. Furthermore, the whole circumference of the covering 36 of the output-side optical fiber 30 is removed from an upstream end of the output-side optical fiber 30 by a predetermined length, which forms an output-side cladding exposure portion 38 in which the cladding (output-side cladding) 34 of the output-side optical fiber 30 is exposed. A downstream end of the input-side cladding exposure portion 28 and an upstream end of the output-side cladding exposure portion 38 are faced with each other in the accommodation space R of the fiber housing portion 10 and connected to each other at a fusion splice portion 40 by fusion splice. In this manner, the input-side cladding exposure portion 28, the output-side cladding exposure portion 38, and the fusion splice portion 40 are received in the accommodation space R of the fiber housing portion 10. Thus, the fiber housing portion 10 serves to protect those components received in the accommodation space R.

As shown in FIG. 2, a high refractive index resin 50 formed of a material having a refractive index that is equal to or higher than the refractive index of the cladding 24 of the input-side optical fiber 20 is received in the accommodation space R of the fiber housing portion 10. The high refractive index resin 50 covers a downstream end of the covering 26 of the input-side optical fiber 20, a portion of the input-side cladding exposure portion 28 that extends from the covering 26 to the fusion splice portion 40, the fusion splice portion 40, and a portion of the output-side cladding exposure portion 38 extending halfway from the fusion splice portion 40. An outer circumferential surface of the high refractive index resin 50 is in contact with the fiber housing portion 10. The high refractive index resin 50 serves to remove cladding mode light $L_C$ propagating through the cladding 24 of the input-side optical fiber 20 and to fix the input-side optical fiber 20 to the fiber housing portion 10.

Furthermore, a fixation resin 60 for fixing the output-side optical fiber 30 to the fiber housing portion 10 is received in the accommodation space R of the fiber housing portion 10. The fixation resin 60 covers an upstream end of the covering 36 of the output-side optical fiber 30. An outer circumferential surface of the fixation resin 60 is in contact with the fiber housing portion 10. The same resin as the aforementioned high refractive index resin 50 may be used for the fixation resin 60.

As shown in FIG. 2, a space S is formed between the high refractive index resin 50 and the covering 36 of the output-side optical fiber 30 along an axial direction of the output-side optical fiber 30. A portion of the output-side cladding exposure portion 38 is exposed to the space S. In other words, a portion of the output-side cladding exposure portion 38 that is located between the high refractive index resin 50 and the covering 36 of the output-side optical fiber 30 is surrounded by air, which is a medium having a refractive index lower than the refractive index of the cladding 34 of the output-side optical fiber 30. Thus, the space S serves as a low refractive index portion having a refractive index lower than the refractive index of the cladding 34 of the output-side optical fiber 30. The refractive index of the low refractive index portion S may be lower than the refractive index of the high refractive index resin 50.

With the aforementioned configuration, when the cladding mode light $L_C$ that has propagated through the cladding 24 of the input-side optical fiber 20 reaches the input-side cladding exposure portion 28, the cladding mode light $L_C$ leaks into the high refractive index resin 50 because the cladding 24 is covered with the high refractive index resin 50. Thus, a portion of the cladding mode light $L_C$ is absorbed by the high refractive index resin 50 and thus converted into heat. The generated heat is transmitted to the fiber housing portion 10 and dissipated into the outside of the cladding mode light removal structure from the fiber housing portion 10 through the heat sink.

At that time, the cladding mode light $L_R$ that has leaked into the high refractive index resin 50 propagates through the high refractive index resin 50 while a portion of such cladding mode light $L_R$ is converted into heat. As described above, the space S is interposed between the high refractive index resin 50 and the covering 36 of the output-side optical fiber 30 along the axial direction of the output-side optical fiber 30. Therefore, the heat generated in the high refractive index resin 50 is hindered from being transmitted directly to the covering 36 of the output-side optical fiber 30.

Furthermore, even if the cladding mode light $L_C$ propagating through the cladding 24 of the input-side optical fiber 20 does not completely leak into the high refractive index resin 50 and partially enters the cladding 34 of the output-side optical fiber 30, such cladding mode light that has entered the cladding 34 can be confined in the cladding 34 of the output-side optical fiber 30 because the low refractive index portion S, which is a medium having a refractive index lower than the refractive index of the output-side cladding 34, is located around the output-side cladding exposure portion 38. Therefore, the cladding mode light is inhibited from leaking near the covering 36 of the output-side optical fiber 30. Thus, absorption of the cladding mode light, which would be caused when leaked cladding mode light directly impinges the covering, is inhibited.

Furthermore, cladding mode light is likely to be generated at the fusion splice portion 40 where two optical fibers 20 and 30 are connected to each other by fusion splice because light propagating through the core 22 of the input-side optical fiber 20 is likely to leak at the fusion splice portion 40. As described above, however, the fusion splice portion 40 and a portion of the output-side cladding exposure portion 38 that is located at a downstream side of the fusion splice portion 40 is covered with the high refractive index resin 50. Therefore, most of cladding mode light generated at the fusion splice portion 40 is allowed to leak into the high refractive index resin 50 and converted into heat.

Figure 3:
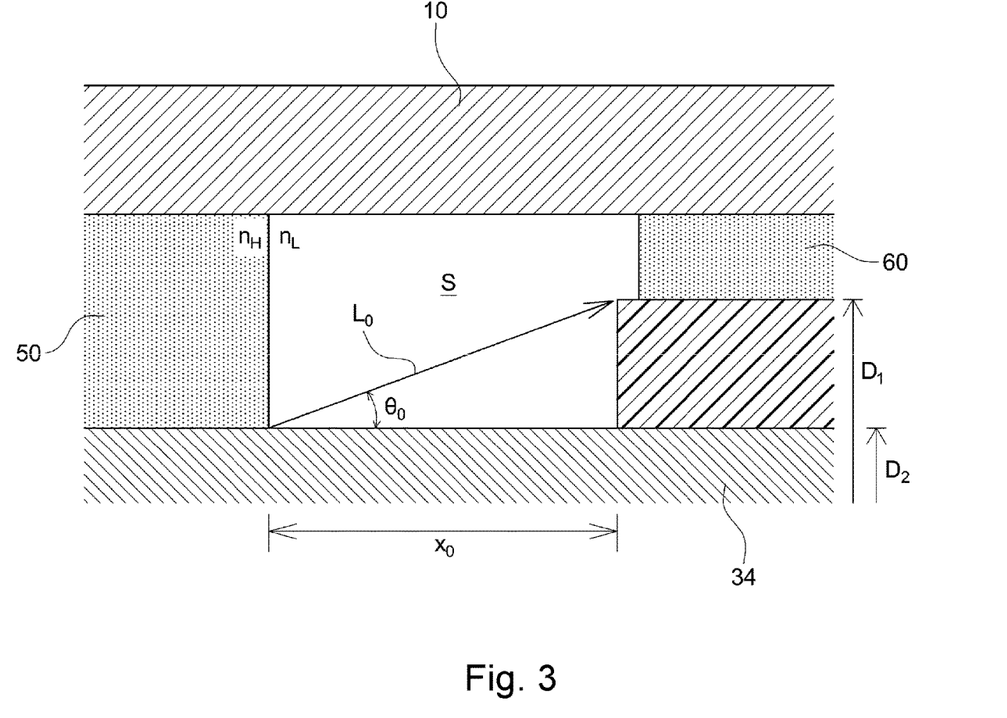
FIG. 3 is a cross-sectional view schematically showing a portion of the cladding mode light removal structure illustrated in FIG. 2.

Meanwhile, the cladding mode light $L_R$ that has propagated through the high refractive index resin 50 may enter the low refractive index portion S. In order to inhibit heat generation at the covering 36 of the output-side optical fiber 30 more effectively, such cladding mode light that has entered the low refractive index portion S should be prevented from directly impinging the covering 36. To address this issue, it is assumed that cladding mode light $L_0$ that enters the low refractive index portion S at the radially innermost portion of a downstream end of the high refractive index resin 50 will reach the radially outermost portion of the covering 36 of the output-side optical fiber 30 as shown in FIG. 3.

The following formula (1) is found where $x_0$ represents the length of the output-side cladding exposure portion 38 of the low refractive index portion S along the axis direction, $\theta_0$ represents an outgoing angle of the cladding mode light at the low refractive index portion S, $D_1$ represents the diameter of the covering 36, and $D_2$ represents the diameter of the output-side cladding 34.

$$\frac{D_1 - D_2}{2} = x_0 \tan \theta_0 \quad (1)$$

This formula is modified into the following formula (2).

$$x_0 = \frac{\frac{D_1 - D_2}{2}}{\tan \theta_0} \quad (2)$$

The following formula (3) is derived from the Snell's law.

$$\frac{\sin \theta_0}{\sin \theta_1} = \frac{n_H}{n_L} \quad (3)$$

where $n_H$ represents the refractive index of the high refractive index resin 50, $n_L$ represents the refractive index of a medium that constitutes the low refractive index portion S (air in one or more embodiments), and $\theta_0$ represents the incident angle of the cladding mode light into the high refractive index resin 50.

The numerical aperture NA of the cladding mode light in the high refractive index resin 50 is represented by NA=sin $\theta_1$. Therefore, the above formula (3) can be modified into the following formulas (4) and (5).

$$\sin \theta_0 = \frac{n_H}{n_L} \times NA \quad (4)$$

$$\theta_0 = \sin^{-1}\left(\frac{n_H}{n_L} \times NA\right) \quad (5)$$

The following formula (6) is derived from the above formulas (2) and (5).

$$x_0 = \frac{\frac{D_1 - D_2}{2}}{\tan\left(\sin^{-1}\left(\frac{n_H}{n_L} \times NA\right)\right)} \quad (6)$$

If the distance x from the covering 36 of the output-side optical fiber 30 to the downstream end of the high refractive index resin 50 along the axial direction of the output-side optical fiber 30 (FIG. 2) is greater than $x_0$ represented by the above formula (5), then cladding mode light that has entered the low refractive index portion S will not directly impinge the covering 36. In other words, the cladding mode light does not directly impinge the covering 36 if the following relationship is met.

$$x > \frac{\frac{D_1 - D_2}{2}}{\tan\left(\sin^{-1}\left(\frac{n_H}{n_L} \times NA\right)\right)} \quad (7)$$

Assuming that the refractive index of the air is 1.00, when the numerical aperture NA of the cladding mode light in the high refractive index resin 50 was varied in a case where a resin having a refractive index of 1.54 was used as the high refractive index resin 50, $x_0$ (unit: μm) was calculated as shown in Table 1 for the following three output-side optical fibers 30.

(1) The covering 36 has a diameter $D_1$=250 μm, and the cladding 34 has a diameter $D_2$=125 μm (2) The covering 36 has a diameter $D_1$=200 μm, and the cladding 34 has a diameter $D_2$=90 μm (3) The covering 36 has a diameter $D_1$=320 μm, and the cladding 34 has a diameter $D_2$=280 μm

| NA | 0.01 | 0.05 | 0.10 | 0.15 | 0.20 | 0.25 | 0.30 | 0.35 | 0.40 |
|---|---|---|---|---|---|---|---|---|---|
| Fiber (1) | 4058 | 809 | 401 | 263 | 193 | 150 | 120 | 98 | 80 |
| Fiber (2) | 3571 | 712 | 353 | 232 | 170 | 132 | 106 | 86 | 70 |
| Fiber (3) | 1299 | 259 | 128 | 84 | 62 | 48 | 38 | 31 | 26 |

Figure 4:
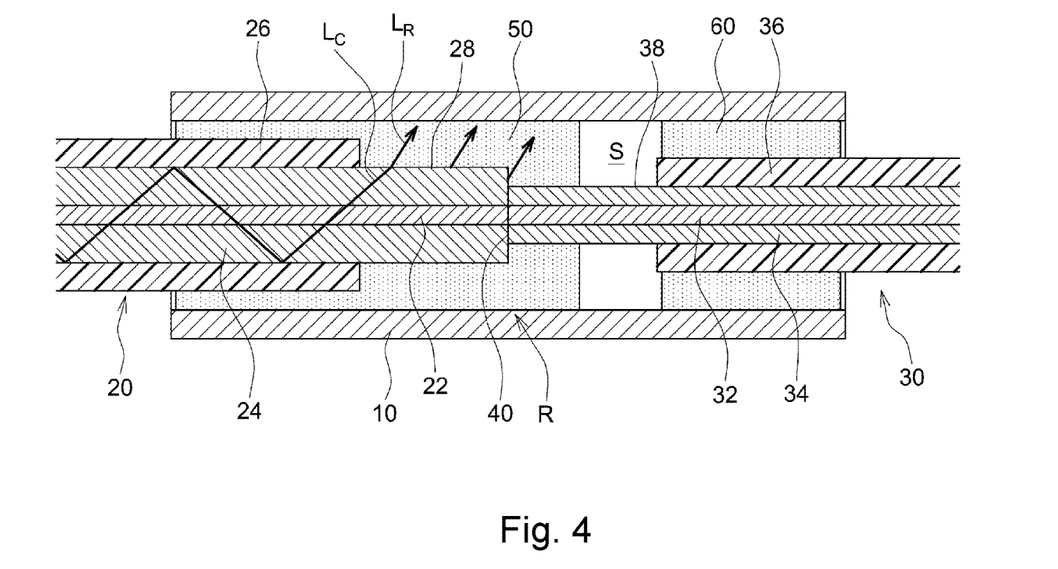
FIG. 4 is a cross-sectional view schematically showing a cladding mode light removal structure according to one or more embodiments of the present invention.

In the above embodiments, the cladding 24 of the input-side optical fiber 20 and the cladding 34 of the output-side optical fiber 30 have the same diameter. Nevertheless, the cladding 24 of the input-side optical fiber 20 and the cladding 34 of the output-side optical fiber 30 may have different diameters. Particularly, when the diameter of the cladding 34 of the output-side optical fiber 30 is smaller than the diameter of the cladding 24 of the input-side optical fiber 20 as shown in FIG. 4, the cladding mode light propagating through the cladding 24 of the input-side optical fiber 20 at the fusion splice portion 40 is more likely to leak into the high refractive index resin 50. Therefore, the cladding mode light can be removed more effectively. Furthermore, this configuration can lower the power density of the cladding mode light leaking out of the cladding 24 as compared to the case where the cladding 24 of the input-side optical fiber 20 and the cladding 34 of the output-side optical fiber 30 have the same diameter. Accordingly, the temperature of the high refractive index resin 50 is inhibited from locally increasing.

In the above embodiments, the low refractive index portion S is formed by air. However, the low refractive index portion S can be formed by any medium having a refractive index lower than the refractive index of the cladding 34 of the output-side optical fiber 30. For example, the low refractive index portion S may be formed by a resin having a refractive index lower than the refractive index of the cladding 34 of the output-side optical fiber 30. In this case, the thermal conductivity of the resin of the low refractive index portion S may be lower than the thermal conductivity of the high refractive index resin 50 in order to inhibit heat generated in the high refractive index resin 50 from transmitting to the covering 36 to the output-side optical fiber 30.

In the aforementioned embodiments, the entire input-side cladding exposure portion 28 is covered with the high refractive index resin 50. Only a portion of the input-side cladding exposure portion 28 may be covered with the high refractive index resin 50. In such a case, a portion of the input-side cladding exposure portion 28, the fusion splice portion 40, and a portion of the output-side cladding exposure portion 38 are covered with the high refractive index resin 50.

Furthermore, in the aforementioned embodiments, each of the input-side optical fiber 20 and the output-side optical fiber 30 is formed by a single-cladding fiber. As a matter of course, however, one or more embodiments of the present invention can be applied to cases where the input-side optical fiber 20 or the output-side optical fiber 30 has two or more claddings. When the input-side optical fiber 20 has a plurality of cladding layers, the high refractive index resin 50 employs a material having a refractive index that is equal to or higher than the refractive index of the outermost cladding layer of the input-side optical fiber 20. Furthermore, when the output-side optical fiber 30 has a plurality of cladding layers, the low refractive index portion S is formed by a medium having a refractive index lower than the refractive index of the outermost cladding layer of the output-side optical fiber 30.

Figure 5:
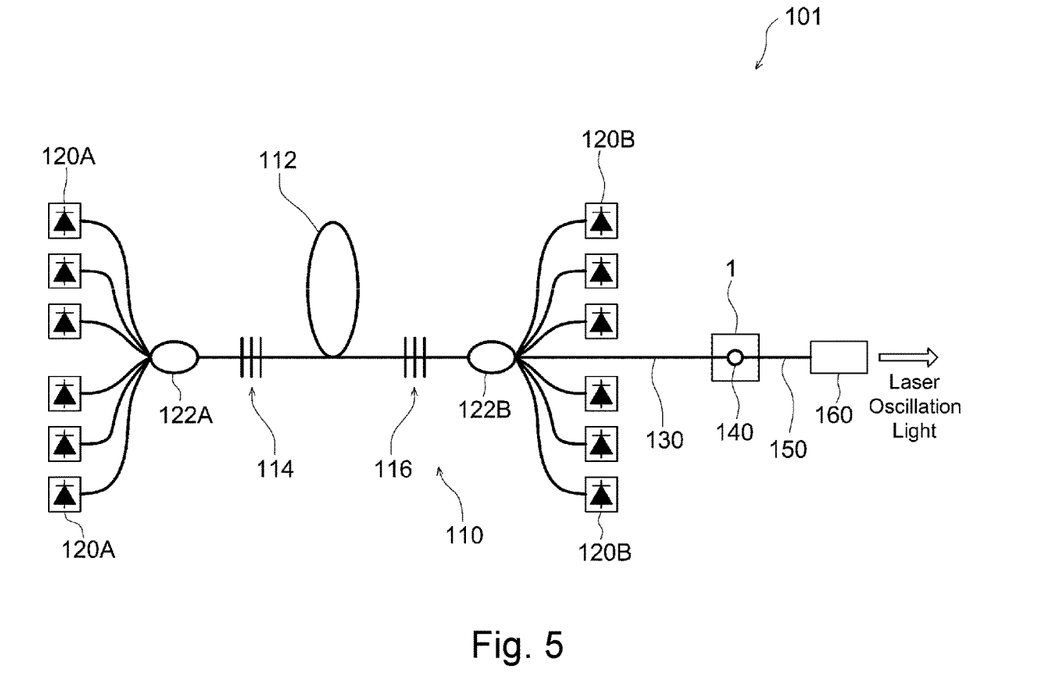
FIG. 5 is a schematic diagram showing an example of a fiber laser to which a cladding mode light removal structure according to one or more embodiments of the present invention can be applied.

The aforementioned cladding mode light removal structure can be applied to any portion where cladding mode light needs to be removed in a laser apparatus such as a fiber laser. FIG. 5 is a schematic view showing an example of a fiber laser to which a cladding mode light removal structure according to one or more embodiments of the present invention is applicable.

A fiber laser 101 illustrated in FIG. 5 includes an optical cavity 110, a plurality of forward pumping light sources 120A operable to introduce pumping light to the optical cavity 110 from a front side of the optical cavity 110, a forward in-line combiner 122A connected to those forward pumping light sources 120A, a plurality of backward pumping light sources 120B operable to introduce pumping light to the optical cavity 110 from a back side of the optical cavity 110, and a backward in-line combiner 122B connected to those backward pumping light sources 120B. The optical cavity 110 includes an amplification optical fiber 112 having a core into which rare earth ions such as yttrium (Yb) or erbium (Er) have been doped, a high reflectivity fiber Bragg grating (HR-FBG) 114 connected to the amplification optical fiber 112 and the forward in-line combiner 122A, and a low reflectivity fiber Bragg grating (Output Coupler Fiber Bragg Grating (OC-FBG)) 116 connected to the amplification optical fiber 112 and the backward in-line combiner 122B. For example, the amplification optical fiber 112 is formed of a double cladding fiber having an inner cladding formed around a core and an outer cladding formed around the inner cladding.

Furthermore, as shown in FIG. 5, the fiber laser 101 has a first delivery fiber 130 extending from the backward in-line combiner 122B and a second delivery fiber 150 connected to the first delivery fiber 130 at a fusion splice portion 140 by fusion splice. A laser emission portion 160 is provided at a downstream end of the second delivery fiber 150 for emitting laser oscillation light from the amplification optical fiber 112, for example, toward a workpiece.

For example, high-power multi-mode semiconductor lasers (LD) having a wavelength of 915 nm may be used as the forward pumping light sources 120A and the backward pumping light sources 120B. The forward in-line combiner 122A and the backward in-line combiner 122B are operable to combine pumping light beams outputted from the forward pumping light source 120A and the backward pumping light source 120B, respectively, and introduce the combined pumping light to the interior of the aforementioned inner cladding of the amplification optical fiber 112. Thus, the pumping light propagates within the inner cladding of the amplification optical fiber 112.

The HR-FBG 114 is formed by periodically varying the refractive index of an optical fiber. The HR-FBG 114 reflects light having a certain wavelength range at a reflectivity near 100%. As with the HR-FBG 114, the OC-FBG 116 is formed by periodically varying the refractive index of an optical fiber. The OC-FBG 116 allows a portion of light having the wavelength range that is to be reflected by the HR-FBG 114 (e.g., 10%) to pass therethrough and reflects the rest of the light. Thus, the HR-FBG 114, the amplification optical fiber 112, and the OC-FBG 116 form the optical cavity 110, which recursively amplifies light having a specific wavelength range between the HR-FBG 114 and the OC-FBG 116 to cause laser oscillation.

In the fiber laser 101 thus configured, the aforementioned cladding mode light removal structure 1 can be applied to, for example, the fusion splice portion 140 where the first delivery fiber 130 and the second delivery fiber 150 are connected to each other by fusion splice. Thus, when the cladding mode light removal structure 1 is applied to the fusion splice portion 140, cladding mode light such as pumping light that has not been absorbed by the amplification optical fiber 112 and the laser light that has leaked from the core of the amplification optical fiber 112 can effectively be removed. As a matter of course, the cladding mode light removal structure 1 may be provided not only at the fusion splice portion 140, but also at any location where cladding mode light needs to be removed.

FIG. 5 illustrates an example a bidirectional pumping fiber laser apparatus where the pumping light sources 120A or 120B and the combiner 122A or 122B are provided for each of the HR-FBG 114 and the OC-FBG 116. However, pumping light sources and a combiner may be provided for one of the HR-FBG 114 and the OC-FBG 116. Furthermore, instead of FBGs, mirrors may be used as reflection means for causing laser oscillation in the optical cavity 110.

Figure 6:
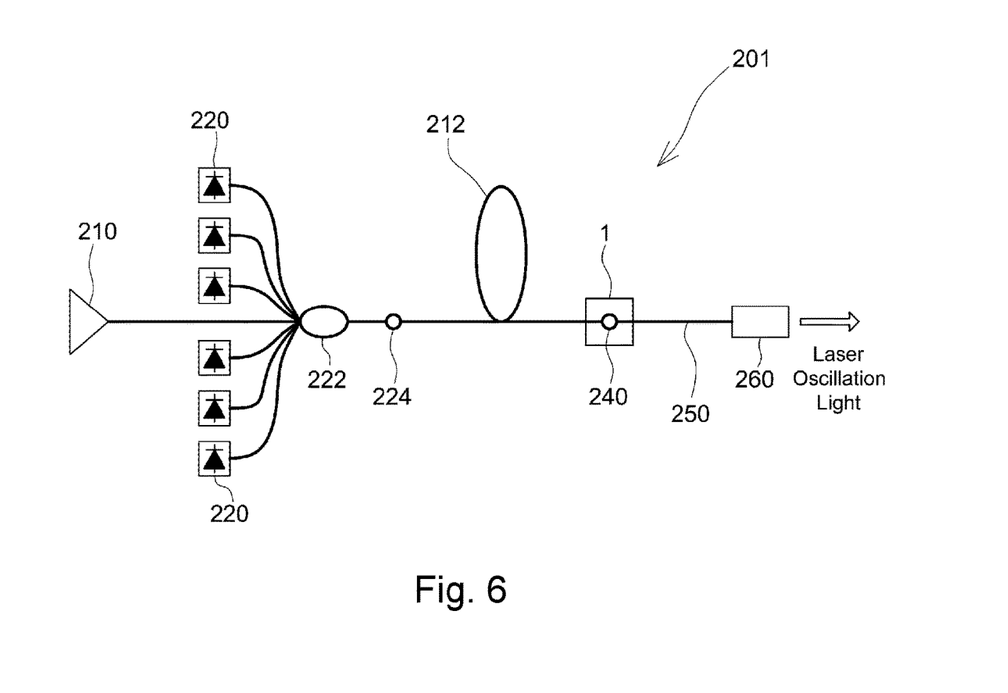
FIG. 6 is a schematic diagram showing another example of a fiber laser to which a cladding mode light removal structure according to one or more embodiments of the present invention can be applied.

FIG. 6 is a schematic view showing another example of a fiber laser to which a cladding mode light removal structure according to one or more embodiments of the present invention can be applied. A fiber laser 201 illustrated in FIG. 6 includes a signal light generator 210 operable to generate signal light, a plurality of pumping light sources 220 operable to generate pumping light, an optical coupler 222 operable to combine the signal light from the signal light generator 210, an amplification optical fiber 212 having an end connected to an output end 224 of the optical coupler 222, and a delivery fiber 250 connected to the amplification optical fiber 212 at a fusion splice portion 240 by fusion splice. A laser emission portion (isolator) 260 is provided at a downstream end of the delivery fiber 250 for emitting laser oscillation light from the amplification optical fiber 212, for example, toward a workpiece.

Figure 7:
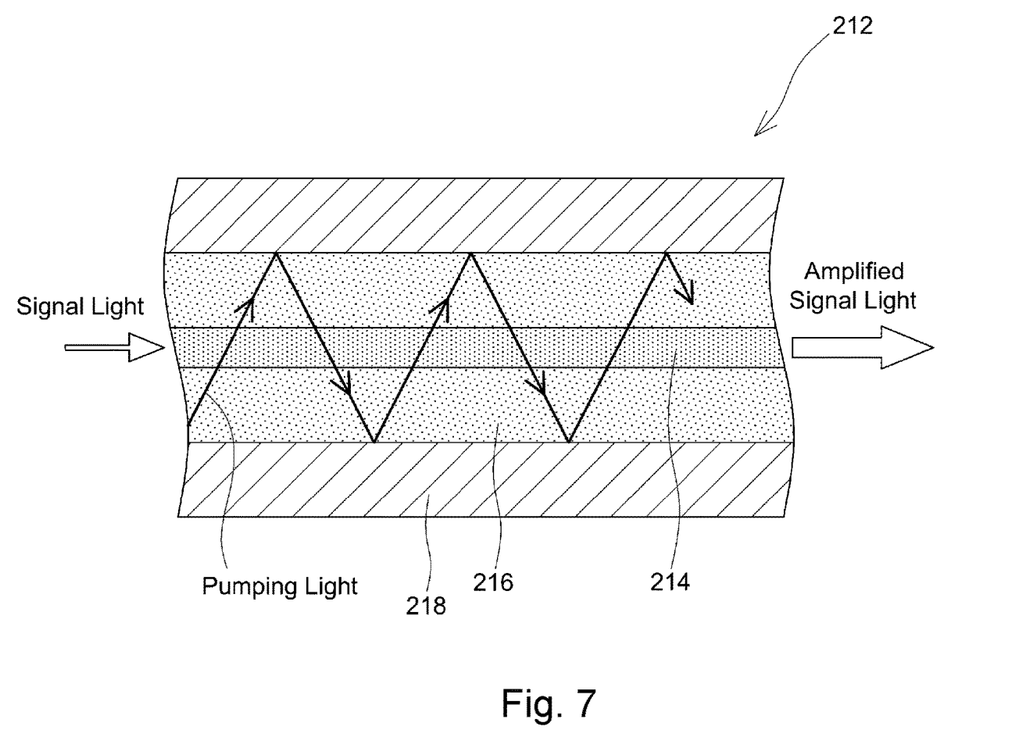
FIG. 7 is a cross-sectional view schematically showing an amplification optical fiber in the fiber laser illustrated in FIG. 6.

FIG. 7 is a cross-sectional view schematically showing the amplification optical fiber 212. As shown in FIG. 7, the amplification optical fiber 212 is formed of a double cladding fiber having a core 214 through which the signal light generated by the signal light generator 210 propagates, an inner cladding 216 formed around the core 214, and an outer cladding 218 formed around the inner cladding 216. For example, the core 214 is formed of $SiO_2$ into which a rare earth element such as Yb has been doped. The core 214 serves as a signal light waveguide through which the signal light propagates. The inner cladding 216 is formed of a material having a refractive index lower than the refractive index of the core 214 (e.g., $SiO_2$). The outer cladding 218 is formed of a resin having a refractive index lower than the refractive index of the inner cladding 216 (e.g., a low refractive index polymer). Thus, the inner cladding 216 serves as a pumping light waveguide through which the pumping light propagates.

The signal light from the signal light generator 210 propagates within the core 214 of the amplification optical fiber 212. The pumping light from the pumping light sources 220 propagates within the inner cladding 216 and the core 214 of the amplification optical fiber 212. When the pumping light propagates through the core 214, the rare earth ions that have doped into the core 214 absorb the pumping light so that those ions are excited so as to amplify the signal light propagating through the core 214 by stimulated emission.

In the fiber laser 201 thus configured, the aforementioned cladding mode light removal structure 1 can be applied to, for example, the fusion splice portion 240 where the amplification optical fiber 212 and the delivery fiber 250 are connected to each other by fusion splice. Thus, when the cladding mode light removal structure 1 is applied to the fusion splice portion 240, cladding mode light such as pumping light that has not been absorbed by the amplification optical fiber 212 and the laser light that has leaked from the core of the amplification optical fiber 212 can effectively be removed. As a matter of course, the cladding mode light removal structure 1 may be provided not only at the fusion splice portion 240, but also at any location where cladding mode light needs to be removed.

Although some embodiments of the present invention have been described, the present invention is not limited to the aforementioned embodiments. It should be understood that various different forms may be applied to the present invention within the technical idea thereof.

INDUSTRIAL APPLICABILITY

One or more embodiments of the present invention are suitably used for a structure for removing cladding mode light that propagates through a cladding of an optical fiber in a laser apparatus such as a fiber laser. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached

DESCRIPTION OF REFERENCE NUMERALS AND SIGNS

1 Cladding mode light removal structure
10 Fiber housing portion
20 Input-side optical fiber
22 Core
24 Input-side cladding
26 Covering
28 Input-side cladding exposure portion
30 Output-side optical fiber
32 Core
34 Output-side cladding
36 Covering
38 Output-side cladding exposure portion
40 Fusion splice portion
50 High refractive index resin
60 Fixation resin
101 Fiber laser
110 Optical cavity
112 Amplification optical fiber
114 HR-FBG
116 OC-FBG
120A, 120B Pumping light source
122A, 122B In-line combiner
130, 150 Delivery fiber
140 Fusion splice portion
160 Laser emission portion
201 Fiber laser
210 Signal light generator
212 Amplification optical fiber
214 Core 216 Inner cladding
218 Outer cladding
220 Pumping light source
222 Optical coupler
224 Output end
240 Fusion splice portion
250 Delivery fiber
290 Output-side cladding exposure portion
R Accommodation space
S Low refractive index portion

The invention claimed is:

1. A cladding mode light removal structure for removing cladding mode light that propagates through an optical fiber cladding, the cladding mode light removal structure comprising:
an input-side cladding exposure portion where a covering is removed from an end of an input-side optical fiber and an input-side cladding of the input-side optical fiber is exposed;
an output-side cladding exposure portion where a covering is removed from an end of an output-side optical fiber and an output-side cladding of the output-side optical fiber is exposed;
a fusion splice portion at which the input-side cladding exposure portion and the output-side cladding exposure portion are connected to each other by fusion splice;
a fiber housing portion having an accommodation space that receives the input-side cladding exposure portion, the output-side cladding exposure portion, and the fusion splice portion;
a high refractive index resin having a refractive index that is equal to or higher than a refractive index of the input-side cladding exposed at the input-side cladding exposure portion, wherein
the high refractive index resin is disposed within the accommodation space of the fiber housing portion and surrounds a downstream end of the covering of the input-side optical fiber, an entire portion of the input-side cladding exposed at the input-side cladding exposure portion, the fusion splice portion, and a portion of the output-side cladding exposed at the output-side cladding exposure portion; and
a low refractive index portion of a medium having a refractive index lower than a refractive index of the output-side cladding of the output-side cladding exposure portion, wherein
the low refractive index portion is disposed around the output-side cladding exposure portion between the high refractive index resin and the covering of the output-side optical fiber along an axial direction of the output-side optical fiber.

2. The cladding mode light removal structure as recited in claim 1, wherein a length x of the low refractive index portion along the axial direction of the output-side optical fiber satisfies $$x > \frac{\frac{D_1 - D_2}{2}}{\tan\left(\sin^{-1}\left(\frac{n_H}{n_L} \times NA\right)\right)}$$

where $D_1$ is a diameter of the covering of the output-side optical fiber,
$D_2$ is a diameter of the output-side cladding of the output-side optical fiber,
$n_H$ is a refractive index of the high refractive index resin,
$n_L$ is a refractive index of the medium of the low refractive index portion, and
NA is a numerical aperture of cladding mode light in the high refractive index resin.

3. The cladding mode light removal structure as recited in claim 1, wherein a diameter of the input-side cladding is greater than a diameter of the output-side cladding.

4. The cladding mode light removal structure as recited in claim 1, wherein the medium of the low refractive index portion comprises air.

5. A laser apparatus comprising:
an optical fiber amplifier comprising:
a pumping light source that outputs pumping light; and
an amplification optical fiber including a core into which a rare earth element to be excited by the pumping light from the pumping light source has been doped; and
the cladding mode light removal structure as recited in claim 1, wherein the input-side optical fiber corresponds to the amplification optical fiber of the optical fiber amplifier or an optical fiber located on a downstream side of the amplification optical fiber.

6. The laser apparatus as recited in claim 5, wherein a length x of the low refractive index portion along the axial direction of the output-side optical fiber satisfies $$x > \frac{\frac{D_1 - D_2}{2}}{\tan\left(\sin^{-1}\left(\frac{n_H}{n_L} \times NA\right)\right)}$$

where $D_1$ is a diameter of the covering of the output-side optical fiber,
$D_2$ is a diameter of the output-side cladding of the output-side optical fiber,
$n_H$ is a refractive index of the high refractive index resin,
$n_L$ is a refractive index of the medium of the low refractive index portion, and
NA is a numerical aperture of cladding mode light in the high refractive index resin.

7. The laser apparatus as recited in claim 5, wherein a diameter of the input-side cladding is greater than a diameter of the output-side cladding.

8. The laser apparatus as recited in claim 5, wherein the medium of the low refractive index portion comprises air.

* * * * *